United States Patent [19]
Maki et al.

[11] Patent Number: 5,812,042
[45] Date of Patent: Sep. 22, 1998

[54] SUPERCONDUCTING MAGNET FORMED BY LAMINATING HOLLOW CONDUCTOR PLATES

[75] Inventors: Naoki Maki, Tokai-mura; Nobuhiro Hara, Hitachi; Shigeru Kakugawa, Hitachi; Masayuki Shibata, Hitachi; Noriaki Hino, Mito; Kenichi Hattori, Hitachi, all of Japan

[73] Assignee: Hitachi, Ltd., Tokyo, Japan

[21] Appl. No.: 604,021

[22] Filed: Feb. 20, 1996

[30] Foreign Application Priority Data

Feb. 28, 1995 [JP] Japan .................................. 7-039689

[51] Int. Cl.$^6$ ...................................... H01F 6/00
[52] U.S. Cl. ........................ 335/216; 505/211; 505/212; 505/726; 505/727; 505/879
[58] Field of Search ..................... 335/216; 336/DIG. 1; 324/318–320; 505/211, 212, 213, 726, 727, 872, 879, 880

[56] References Cited

U.S. PATENT DOCUMENTS 3,668,581  6/1972  Schrader .
4,190,817  2/1980  Rabinowitz .
4,996,508  2/1991  Hed .
5,289,150  2/1994  Rabinowitz ............................. 335/216

FOREIGN PATENT DOCUMENTS

A 0 139 308   5/1985   European Pat. Off. .
A 0 029 723  12/1988   European Pat. Off. .
A 0 340 860  11/1989   European Pat. Off. .

*Primary Examiner*—M. L. Gillner
*Assistant Examiner*—Raymond Barrera
*Attorney, Agent, or Firm*—Antonelli, Terry, Stout & Kraus, LLP

[57] ABSTRACT

A laminated superconducting magnet includes a multilayer short-circuit superconductor group 2 formed by uniting superposed hollow superconducting plates, and an exciting coil 3 for inducing a current from an external power source 4 to the multilayer short-circuit superconductor group 2 for operation in a permanent current mode. Even if some of the superconducting plates are quenched, the other normal superconducting plates share the excess current temporarily. Therefore, the entire superconducting magnet is not quenched.

9 Claims, 5 Drawing Sheets

SUPERCONDUCTING MAGNET FORMED BY LAMINATING HOLLOW CONDUCTOR PLATES

BACKGROUND OF THE INVENTION

The present invention relates to a laminated superconducting magnet for operating a multilayer short-circuit superconductor group formed by stacking hollow plates of a superconductor in a permanent current mode, practically having the shape of a solenoid, a racetrack or a saddle, and capable of being used on an MRI apparatus (nuclear magnetic resonance imaging apparatus), a nuclear fusion reactor, a rotary machine or an accelerator.

Generally, a superconducting magnet is fabricated by winding a superconducting wire in a coil. As is generally known, a superconducting plate of about 1 mm in thickness or a superconducting cylinder formed by laminating superconducting thin films is used as a magnetic shield for ac superconducting apparatuses. The superconducting plate or the superconducting cylinder has a passive means for preventing the leakage of an external magnetic field into the apparatus or the leakage of a magnetic field created by the apparatus, and the function of the superconducting plate or the superconducting cylinder is different from that of an active magnet.

A conventional one-turn conductor high-temperature superconducting bulk magnet is liable to be quenched by an external disturbance.

It is an object of the present invention to prevent the quenching of a conductor superconducting magnet.

SUMMARY OF THE INVENTION

The foregoing problem can be solved by the use of a multilayer short-circuit superconductor group of a solenoid type having a circular, elliptic or D-shaped cross section, a multilayer short-circuit superconductor group of a racetrack type or a multilayer short-circuit superconductor group of a saddle type, formed by stacking a plurality of hollow superconducting plates.

According to the present invention, a plurality of multilayer short-circuit superconductor groups are arranged axially, diametrically or circumferentially to improve the magnetic field or the uniformity of the magnetic field.

According to the present invention, the sectional area of a portion of the multilayer short-circuit superconductor group in a high magnetic field region is made greater than that of a portion in a low magnetic field region so as to use the superconducting performance effectively.

According to the present invention, high-strength plates of a stainless steel or the like are placed between the adjacent hollow concentric superconducting plates forming the multilayer short-circuit superconductor group or a high-strength support member is attached to the circumference or a part of the circumference of the multilayer short-circuit superconducting group, to enhance the mechanical strength so that the movement of the superconducting plates can be prevented.

According to the present invention, highly heat-conductive plates, such as Cu plates, Ag plates or Al plates, are placed between the adjacent hollow superconducting plates of the multilayer short-circuit superconductor group or a cooling path is formed around, in a part of the inner circumference of, or within the multilayer short-circuit superconductor group, or in a support member for passing a cooling medium, to enhance the cooling performance so that a rise in temperature of the superconductor due to a disturbance can be suppressed.

The present invention determines the disposition and the length of an exciting coil, and provides a high-current exciting method, and a method of recovering superconductivity from the outer portion toward the inner portion, to enable the effective operation of the multilayer short-circuit superconductor group in a permanent current mode.

Since the superconducting magnet comprises multilayer short-circuit superconductor group of a solenoid type, a racetrack type or a saddle type formed by stacking a plurality of hollow superconducting plates, and a permanent current is induced in each superconducting plate, even if some of the superconducting plates are quenched by a disturbance, the quenched superconducting plates recover their superconductivity while the other normal superconducting plates share the excess current temporarily, and share the current. Therefore, the entire superconducting magnet is not quenched.

Since the plurality of multilayer short-circuit superconductor groups arranged axially, diametrically or circumferentially, the magnetic field or the uniformity of the magnetic field is improved.

Since the sectional area of a portion of the multilayer short-circuit superconductor group in a high magnetic filed region is greater than that of a portion of the same in a low magnetic field region, the current density in the portion in the high magnetic field region can be reduced, and the superconducting performance can be uniformly and effectively used in the high and the low magnetic field regions.

When high-strength plates of a stainless steel or the like are placed between the adjacent hollow superconducting plates forming the multilayer short-circuit superconductor group or when a high-strength support member is attached to the circumference or a part of the circumference of the multilayer short-circuit superconducting group, the movement of the superconducting plates due to an electromagnetic force or thermal stress can be suppressed, frictional heat generated by the superconducting plates can be reduced and the superconducting plates can be prevented from quenching.

When highly heat-conductive plates, such as Cu plates, Ag plates or Al plates, are placed between the adjacent hollow concentric superconducting plates of the multilayer short-circuit superconductor group or a cooling path is formed around, in a part of the inner circumference of or within the multilayer short-circuit superconductor group or in the support member to pass a cooling medium, the heat capacity is increased by heat conduction and the heat can be smoothly removed by heat transfer to the cooling medium even if the superconductors are disturbed, a rise in temperature of the superconductor can be suppressed and hence quenching can be prevented.

Since the exciting coil is disposed outside, inside or within the multilayer short-circuit superconductor group, or the exciting coil is made longer than the multilayer short-circuit superconductor group, the magnetic flux of the exciting coil can be most effectively used for exciting the multilayer short-circuit superconductor group. Since a high current exciting method excites the exciting coil so that a current capable of quenching the multilayer short-circuit superconductor group is employed, the multilayer short-circuit superconductor group can be easily operated in a permanent current mode. Further, since the superconducting performance is recovered gradually from the outer portion toward the inner portion of the multilayer short-circuit superconductor group in a permanent current mode, the interlinkage magnetic flux can be effectively used without allowing the leakage of the interlinkage magnetic flux.

DESCRIPTION OF PREFERRED EMBODIMENTS

Preferred embodiments of the present invention will be described hereinafter with reference to the accompanying drawings.

Figure 1:
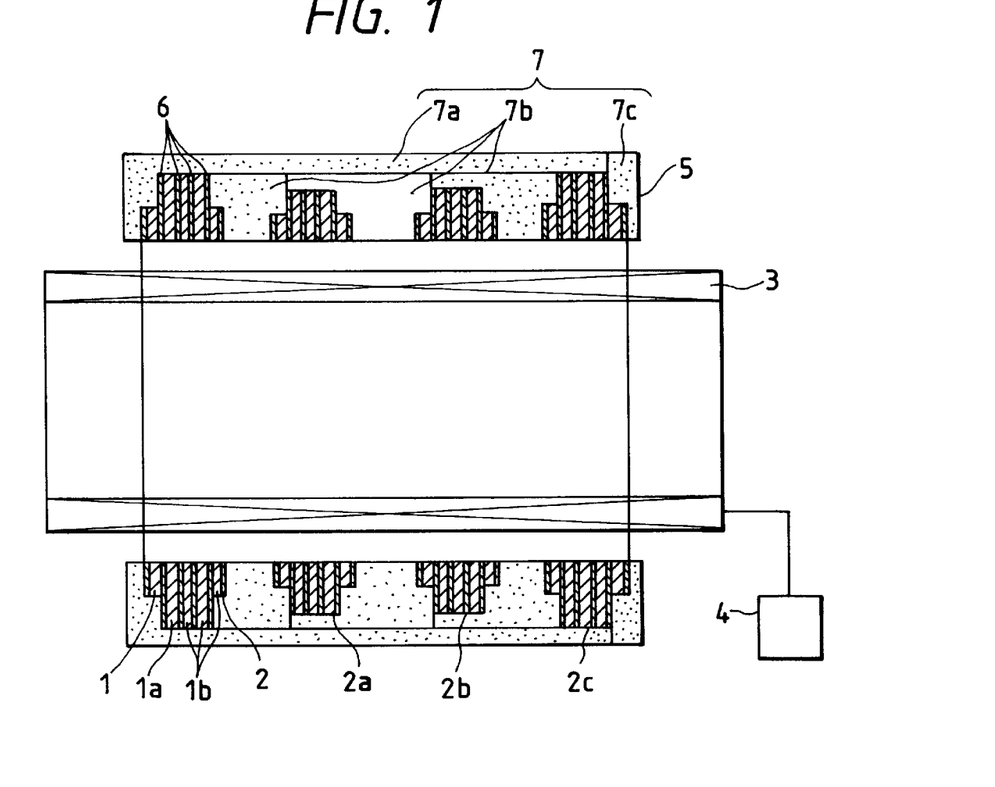
FIG. 1 is a schematic longitudinal sectional view of a solenoid type superconducting magnet in a first embodiment according to the present invention intended for application to an MRI apparatus.

FIG. 1 shows a hollow conducting plate laminated superconducting magnet in a first embodiment according to the present invention as applied to an MRI apparatus. A multilayer short-circuit superconductor group 2 is formed by stacking hollow superconducting plates 1. When a current is supplied to an exciting coil 3 by an external power source 4, a current is induced in the multilayer short-circuit superconductor group 2. The current is maintained to enable a superconducting magnet 5 to operate in a permanent current mode. The multilayer short-circuit superconductor group 2 comprises a plurality of short-circuit superconducting plates 1 of a thickness on the order of 1 mm. Therefore, even if the superconducting plate 1a is quenched by a disturbance, such as frictional heat generated by the movement of the superconducting plate 1a or heat due to alternating current loss, the other normal superconducting plates 1 and 1b will increase the current so as to compensate for a current reduction by performance unique to superconduction to maintain the interlinkage magnetic flux. When the disturbance, i.e., the heat, is removed, the quenched superconducting plate 1a is cooled and recovers superconductivity, a current resumes flowing, and the current increment in the other normal superconducting plates 1 and 1b decreases to a normal current. Thus, the entire superconducting magnet 5 is never quenched and is highly stable.

Although a ring having a hollow concentric section is suitable as the hollow superconducting plate 1 shown in FIG. 1, because such a ring receives a magnetic force uniformly and has a comparatively small weight, the inner and the outer circumferences of the hollow superconducting plate 1 may have any optional shape, such as a rectangular shape, depending on the use of a superconducting magnet 5. The multilayer short-circuit superconductor group 2 formed by stacking the annular superconducting plates 1 in the shape of a solenoid is suitable for use on the MRI apparatus because such a shape is suitable for improving both the intensity of the magnetic field and the uniformity of the magnetic field.

The magnetic field can be enlarged or the uniformity of the magnetic field can be improved by axially arranging multilayer short-circuit superconductor groups $2a$, $2b$ and $2c$ in addition to the multilayer short-circuit superconductor group 2, as shown in FIG. 1. A diametrical arrangement of the multilayer short-circuit superconductor groups 2, not shown, forms an enlarged magnetic field.

Figure 2:
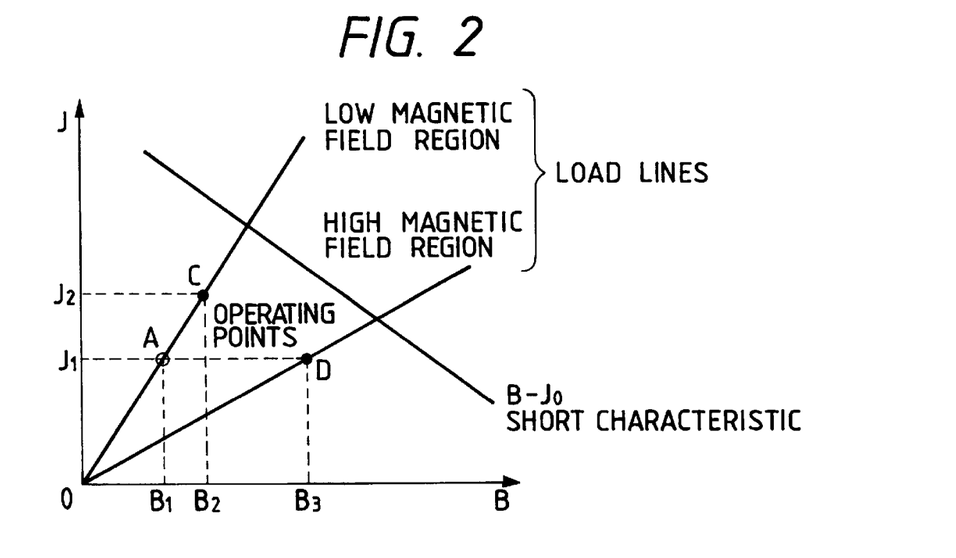
FIG. 2 is a graph of assistance in explaining the B-J characteristic of a superconductor and the operating point of a superconducting magnet.

As shown in FIG. 1, the stacking thickness of a portion of the multilayer short-circuit superconductor group 2 on the side of the inner circumference in a higher magnetic field intensity region is greater than that of a portion of the same on the side of the outer circumference in a lower magnetic field intensity region. As shown in FIG. 2, a superconductor has the $B$-$J_c$ short characteristic, that is, a drooping characteristic, that makes the critical current density $J_c$ decrease as the magnetic field B increases and, therefore, the allowable current density in a portion in a higher magnetic field region is smaller than that in a portion in a lower magnetic field region. When the sectional area of a portion of a superconductor in a lower magnetic field region is equal to that of a portion of the same in a higher magnetic field region, the allowable current density for the portion in the lower magnetic field region is limited by the allowable current density for the portion in the higher magnetic field region because the same current flows through those portions in both regions, the operating point A ($B_1$, $J_1$) on a load line is low as compared with the critical $B$-$J_c$ short characteristic, and the allowance is excessively large and wasteful. When the sectional area of a portion of the superconductor in a higher magnetic field region is greater than that of a portion of the same in a lower magnetic field region as shown in FIG. 1, the supply current can be increased without increasing the current density, the current density in the portion in the lower magnetic field region increases and the operating point rises to a working point C ($B_2$, $J_2$) on the load line. This operating point C ($B_2$, $J_2$), as well as an operating point D ($B_3$, $J_1$) on a load line for the portion in the higher magnetic field region, is substantially equal to a point on the B-$J_c$ characteristic line, for example, a load factor of about 80% as compared with a point on the B-Jc characteristic line in FIG. 2, and the wasteful allowance of the portion in the lower magnetic field region can be reduced and the performance of the superconductor can be uniformly and effectively exerted in both the lower magnetic field region and the higher magnetic field region. This improvement reduces the quantity of the superconductor for a necessary magnetic field. A multilayer short-circuit superconductor group having a portion in a higher magnetic field region having a sectional area greater than that of a portion in a lower magnetic field region may be formed by stacking wedge-shaped hollow superconducting plates having a portion on the side of the inner circumference having a thickness greater than that of a portion on the side of the outer circumference. In a magnet system employing a plurality of multilayer short-circuit superconductor groups as shown in FIG. 1, magnetic fields created by the multilayer short-circuit superconductor groups disposed at the opposite ends of the magnetic system are small, and the diametrical length of those multilayer short-circuit superconducting groups may be smaller than those of the multilayer short-circuit superconductor groups disposed in the middle section of the magnetic system. When the diametrical length of the multilayer short-circuit superconductor groups disposed at the opposite ends of the magnet system is greater than that of the multilayer short-circuit superconductor groups disposed in the middle section of the magnet system, a uniform magnetic field region in the solenoid coil can be enlarged.

When the hollow superconducting plates of FIG. 1 are formed of an alloy superconductor, such as NbTi, the hollow superconducting plates are resistant to straining, easy to machine and easy to be supported. When the hollow superconducting plates are formed of a compound superconductor, such as $Nb_3Sn$, the hollow superconducting plates are capable of creating a high magnetic field and will have a high temperature margin. When the hollow superconducting plates are formed of a ceramic superconductor, such as a ceramic material of the Y family, the Bi family or the Ti family, nitrogen which is inexpensive and easy to handle as compared with helium, can be used as a cooling medium. When highly conductive plates, such as Cu plates, Ag plates or Al plates, are united with the hollow superconducting plates of any of the aforesaid materials, the hollow superconducting plates are stabilized effectively and will not be quenched by a disturbance. The highly conductive plates may be united with the hollow superconducting plates by pressure welding using rolls or a press, or highly conductive films may be formed over the hollow superconducting plates by a film forming process, such as a metal spraying process. A desirable thickness of the hollow superconducting plates to eliminate electromagnetic instability, such as flux jump of the hollow superconducting plates, is several tens of micrometers or below. Therefore, a multilayer short-circuit superconductor group may be formed by laminating a plurality of plates each formed by uniting a thin hollow superconducting plate and a thin highly conductive plate, such as Cu plates, Ag plates or Al plates.

Spacers 6 having the shape of a hollow plate may be placed between the hollow superconducting plates 1 of the multilayer short-circuit superconductor group 2 to facilitate supporting the multilayer short-circuit superconductor group 2 and to improve the cooling performance of the same. Spacers of a high-strength material, such as a stainless steel, restrain the hollow superconducting plates from being moved by electromagnetic force or the like and prevent the resulting generation of frictional heat. When spacers of a material having a high heat conductivity, such as Cu, a Cu alloy, Al or an Al alloy are used, heat generated by a disturbance can be quickly transferred to the environment, whereby a temperature rise of the superconducting plates can be suppressed and quenching can be effectively prevented.

As shown in FIG. 1, a support member 7 is fixed to the circumferences and portions of the side surfaces of the multilayer short-circuit superconductor groups 2, 2a, 2b and 2c. The multilayer short-circuit superconductor group 2 can be inserted in a support member 7a having an L-shaped section. An annular support member 7b is fitted in the support member 7a so as to be contiguous with the side surface of the multilayer short-circuit superconductor group 2, and the multilayer short-circuit superconductor group 2a is inserted in the support member 7a so as to be contiguous with the side surface of the support member 7b. This process is repeated and, finally, an annular support member 7c is pushed in to support the multilayer short-circuit superconductor groups 2, 2a, 2b and 2c firmly. When formed of a high-strength material, such as a stainless steel, the support members 7, 7a, 7b and 7c are able to support the multilayer short-circuit superconductor groups 2, 2a, 2b and 2c very firmly, and hence there is no possibility that the superconducting plates move. When the support members are formed of a highly heat-contractive material, such as Al or an Al alloy, the multilayer short-circuit superconductor groups can be further firmly supported by using the large thermal contraction of the support members due to cooling. When the support members are formed of a highly heat-conductive material, such as Cu or a Cu alloy, heat generated by the multilayer short-circuit superconductor groups due to a disturbance can be dissipated through the support members, so that the quenching of the multilayer short-circuit superconductor groups can be prevented.

As shown in FIG. 1, since the exciting coil 3 is disposed inside the superconducting magnet 5, the exciting coil 3 can be formed in a compact construction. When the exciting coil 3 surrounds the superconducting magnet 5, the magnetization flux of the superconducting magnet has neither a positive nor a negative component and the exciting flux can be effectively used. Although the superconducting magnet 5 is comparatively large when the superconducting magnet 5 is provided with a built-in exciting coil, the use of a separate exciting coil is unnecessary. When the exciting coil is longer than the multilayer short-circuit superconductor groups, regardless of the arrangement of the exciting coil relative to the superconducting magnet 5, the magnetization flux of the superconducting magnet 5 is uniform and the exciting magnetic flux can be further effectively used.

Figure 3:
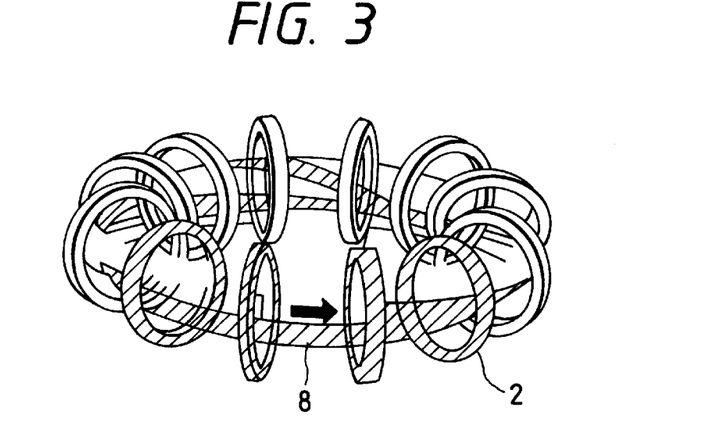
FIG. 3 is a perspective view of a superconducting magnet in a second embodiment according to the present invention formed by arranging multilayer short-circuit superconductor groups in a toroidal shape.
Figure 4:
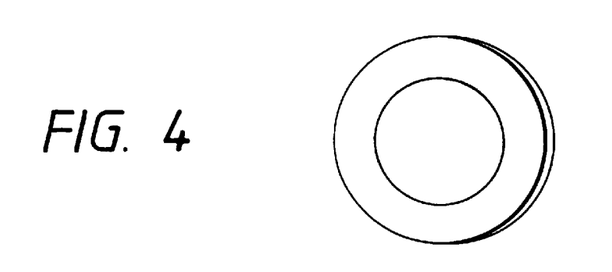
FIG. 4 is a cross-sectional view of a solenoid type multilayer short-circuit superconductor group in accordance with the present invention.
Figure 5:
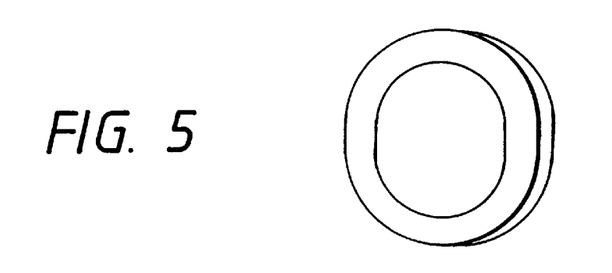
FIG. 5 is a cross-sectional view of a solenoid type multilayer short-circuit superconductor group in accordance with the present invention.
Figure 6:
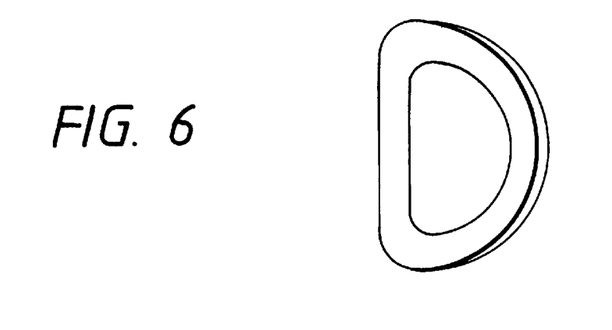
FIG. 6 is a cross-sectional view of a solenoid type multilayer short-circuit superconductor group in accordance with the present invention.

FIG. 3 shows a hollow conductor plate laminated superconducting magnet in a second embodiment according to the present invention as applied to a nuclear fusion reactor. Twelve solenoid-shaped multilayer short-circuit superconductor groups 2 are arranged in a toroidal arrangement to confine a plasma 8 in a ring-shape in the superconducting magnet. An arrangement of multilayer short-circuit superconductor groups 2 as shown in FIG. 4 can be applied to a superconducting energy storage system. The multilayer short-circuit superconductor group shown in FIG. 4 has an effect of remarkably reducing leakage flux. The cross section of the multilayer short-circuit superconductor groups 2 shown in FIG. 3 may have a circular shape as shown in FIG. 4, an elliptic shape as shown in FIG. 5 or a D-shape as shown in FIG. 6, which reduces stress.

Figure 7:
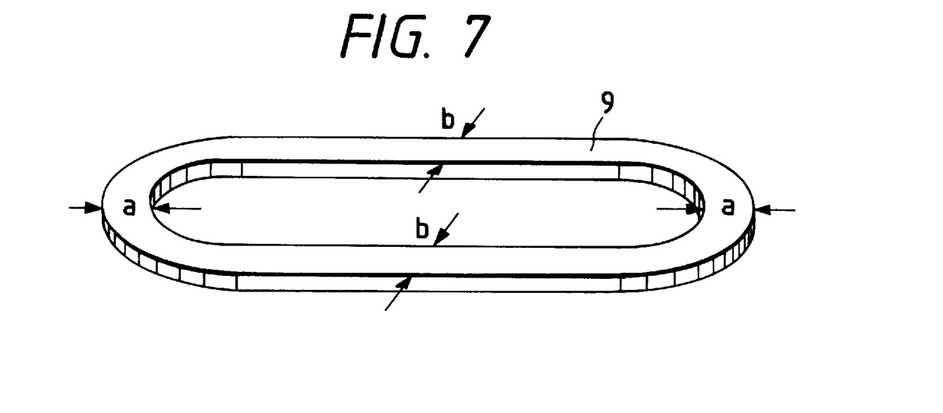
FIG. 7 is a perspective view of a racetrack type multilayer short-circuit superconducting group employed in a superconducting magnet in a third embodiment according to the present invention.
Figure 8:
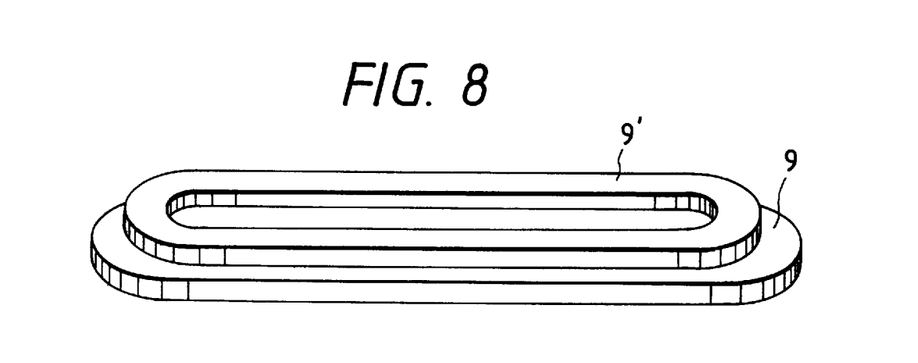
FIG. 8 is a perspective view of two superposed racetrack type multilayer short-circuit superconductor groups.

FIG. 7 shows a multilayer short-circuit superconductor group 9 having the shape of a racetrack for forming a laminated superconducting magnet in a third embodiment according to the present invention, which is suitable for application to a superconducting rotary machine. The multilayer short-circuit superconductor group 9 is able to create a high magnetic field in a wide region. End portions in which a high magnetic field is formed have a length a greater than the length b of the middle portions to use the superconducting performance effectively as mentioned previously with reference to FIG. 2, to enhance the magnetic field and to reduce the necessary amount of the superconductor. A high magnetic field can be created in a necessary space by superposing racetrack-shaped multilayer short-circuit superconductor groups 9 and 9' as shown in FIG. 8. When the multilayer short-circuit superconductor groups 9 and 9' are formed in different sizes, the multilayer short-circuit superconducting groups can be effectively disposed in a narrow cylindrical space and the concentration of magnetic flux on the end portions can be prevented.

Figure 9:
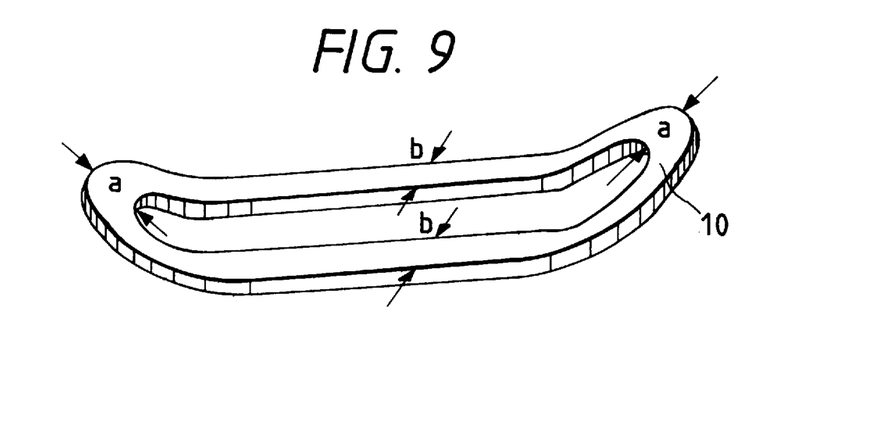
FIG. 9 is a perspective view of a saddle type multilayer short-circuit superconductor group employed in a superconducting magnet in a fourth embodiment according to the present invention.
Figure 10:
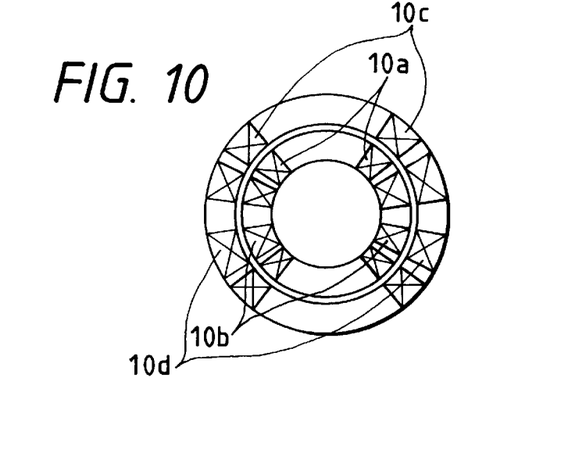
FIG. 10 is a cross-sectional view of a superconducting magnet in accordance with the present invention provided with eight saddle type multilayer short-circuit superconducting groups.

FIG. 9 shows a saddle-shaped multilayer short-circuit superconductor group 10 for forming a laminated superconducting magnet in a fourth embodiment according to the present invention, which is suitable for application to an accelerator dipole. When the saddle-shaped multilayer short-circuit superconducting groups 10 are disposed symmetrically opposite to each other, a high magnetic field of necessary high uniformity can be created. The end portions in which high magnetic regions are formed have a length a greater than the length b of the middle portions to use the superconducting performance effectively, as mentioned previously with reference to FIG. 2, to enhance the magnetic field and to reduce the necessary quantity of the superconductor. The intensity and the uniformity of the magnetic field in a necessary space can be further improved, as shown in FIG. 10, by circumferentially arranging oppositely-disposed saddle-shaped multilayer short-circuit superconductor groups 10a and 10b or diametrically superposing multilayer short-circuit superconductor groups 10 and 10d and the multilayer short-circuit superconducting groups 10a and 10b.

Figure 11:
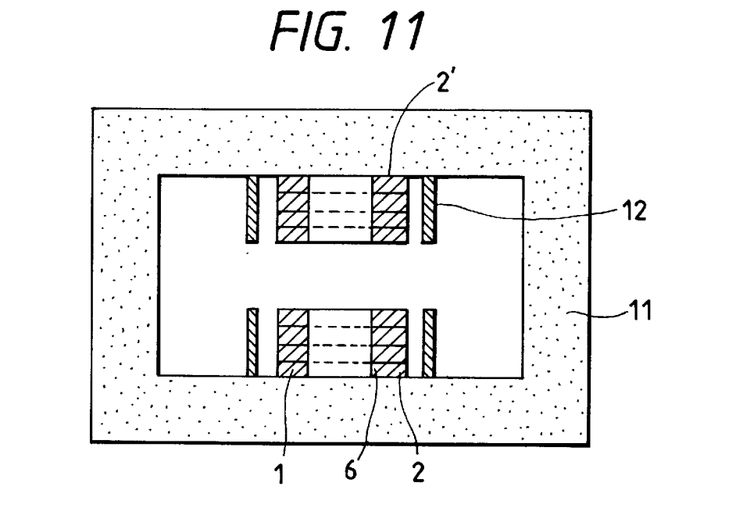
FIG. 11 is a sectional view of an H-shaped magnet in a fifth embodiment according to the present invention.

FIG. 11 shows a laminated superconducting magnet in a fifth embodiment according to the present invention, which is suitable for application to an H-shaped magnet for an accelerator. Solenoid-shaped multilayer short-circuit superconductor groups 2 and 2' are formed by stacking a plurality of plates each formed by uniting a hollow superconducting plate 1 and a hollow spacer 6, and are disposed opposite to each other so as to form a gap therebetween. An H-shaped core 11 for forming a magnetic path is attached to the back surfaces of the multilayer short-circuit superconductor groups 2 and 2'. A permanent high magnetic field can be created in the gap. When hollow cylindrical superconducting magnetic shields 12 are disposed so as to surround the multilayer short-circuit superconducting groups 2 and 2', leakage flux can be reduced and magnetic flux can be concentrated in a high magnetic flux density to form a high magnetic field in the gap.

Figure 12:
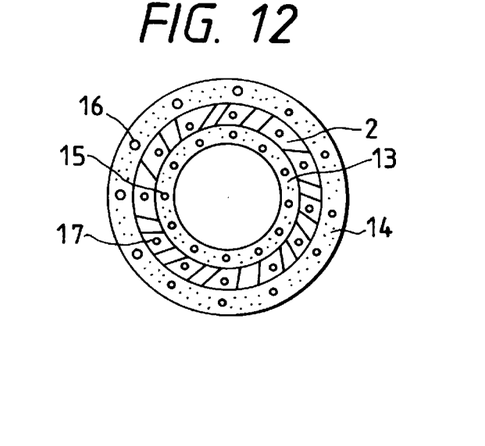
FIG. 12 is a cross-sectional view of a ring-shaped multilayer short-circuit superconducting group in accordance with the present invention provided with cooling holes.
Figure 13:
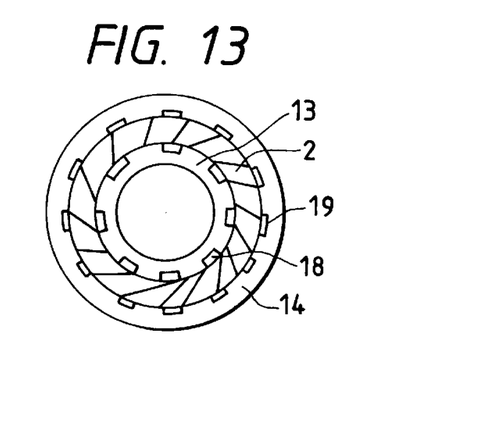
FIG. 13 is a cross sectional view of a ring-shaped multilayer short-circuit superconducting group in accordance with the present invention provided with cooling grooves.

FIGS. 12 and 13 show cooling paths for multilayer short-circuit superconductor groups. An inner support member 13 is fitted in, an outer support member 14 is fitted on, or the inner support member 13 is fitted in and the outer support member 14 is fitted on a multilayer short-circuit superconductor group 2. As shown in FIG. 13, cooling holes 15 are formed in the inner support member 13, cooling holes 16 are formed in the outer support member 14 or cooling holes 17 are formed in the multilayer short-circuit superconductor group 2, for cooling the cooling paths for a cooling medium. As shown in FIG. 13, cooling grooves 18 may be formed in the outer circumference of the inner support member 13 in contact with the multilayer short-circuit superconductor group 2 or cooling grooves 19 may be formed in the inner circumference of the outer support member 14 in contact with the multilayer short-circuit superconductor group 2, for cooling the cooling paths. A cooling medium may be allowed to flow along the inner circumference of the inner support member 13 or along the outer circumference of the outer support member 14 for cooling.

A method of exciting the multilayer short-circuit superconductor group will be described hereinafter.

Figure 14:
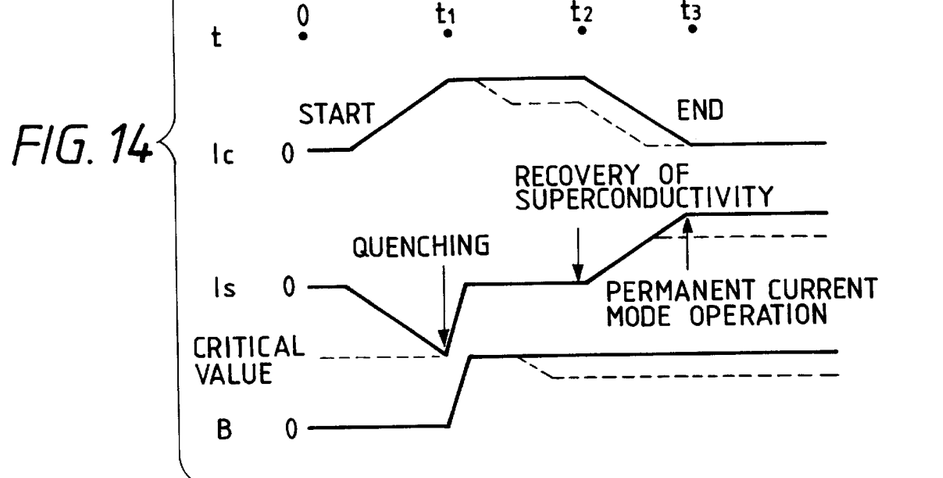
FIG. 14 is a time chart of assistance in explaining a high-current exciting method of exiting a superconducting magnet in accordance with the present invention.

FIG. 14 shows the variation of exciting current Ic supplied to the exciting coil 3 (FIG. 1), the variation of current $I_s$ induced in the solenoid-shaped multilayer short-circuit superconductor group 2 (FIG. 1) and the variation of created magnetic field B, each with time t. When the exciting current is supplied to the exciting coil, a reverse current starts flowing through the multilayer short-circuit superconductor group to maintain the interlinkage flux at zero because the multilayer short-circuit superconductor group is in a superconductive state. When the exciting current is increased to an extent where the current induced in the multilayer short-circuit superconductor group reaches a critical value, the transition of the multilayer short-circuit superconductor group from the superconductive state to the normal conductive state occurs at time $t_1$. Then, the current decreases to zero and the created magnetic field increases from zero to a fixed value accordingly. The multilayer short-circuit superconductor group is cooled and recovers the superconductive state in a short time. When it is started at time $t_2$ to decrease the exciting current gradually, current starts flowing in the multilayer short-circuit superconductor group to maintain a fixed interlinkage magnetic field. When the exciting current reaches zero at time $t_3$, the current induced in the multilayer short-circuit superconductor group reaches substantially a maximum value and operation in the permanent current mode is started. When the exciting current is reduced before the multilayer short-circuit superconductor group recovers the superconductive state, the current induced in the multilayer short-circuit superconductor group can be reduced by a reduction corresponding to the reduction of the exciting current from the critical value, as indicated by the broken line in FIG. 14. Although the created magnetic field is reduced accordingly, the multilayer short-circuit superconductor group is able to operate stably with an appropriate current margin. When this high-current exciting method is employed, only the regulation of the exciting current is necessary and the multilayer short-circuit superconductor group need not be heated by a heater for transition between the superconductive state and the normal conductive state. Therefore, the operation is simple and no additional equipment is necessary.

Figure 15:
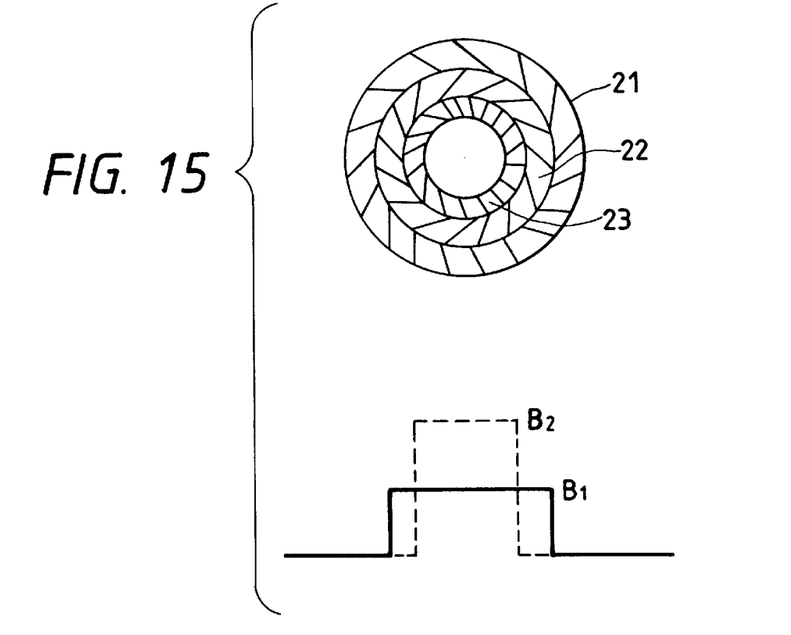
FIG. 15 is an illustration of a method of effectively trapping magnetic flux in accordance with the present invention.

FIG. 15 illustrates a method of effectively trapping the magnetic field created by exciting the multilayer short-circuit superconductor group by the method described with reference to FIG. 14 by way of example. This trapping method decreases the exciting current as the multilayer short-circuit superconductor group recovers the superconducting performance gradually from the outer portion 21 through the middle portion 22 toward the inner portion 23.

If the exciting current is reduced after the outer portion 21, the middle portion 22 and the inner portion 23 have simultaneously recovered superconductivity, a magnetic field $B_1$ is trapped. When the exciting current is reduced by ⅓ after only the outer portion 21 has recovered superconductivity, the exciting current is reduced by ⅔ after the middle portion 22 has recovered superconductivity and the exciting current is reduced to zero after the inner portion 23 has recovered superconductivity by the method employed by the present invention, the trapped region of the generated magnetic flux is shoved inward, and the created magnetic field increases to $B_2$ in inverse proportion to the ratio of the area of the trapped region because the magnetic flux is fixed. This magnetic field concentrating method has the effect of creating a high magnetic field. Another method of making the multilayer short-circuit superconductor group recover superconducting performance gradually from the outer portion toward the inner portion is by using a controlled system that employs heaters for regulating the respective temperatures of the portions and turns off the heaters at different times. A third method using an automatic system is formed so that the superconducting performance of the inner portions is higher than that of the outer portions. When the third method using an automatic system is employed, the inner portions are formed of materials having a superconducting performance higher than that of materials forming the outer portions or a multilayer short-circuit superconductor group has thickness increasing from the outer portion toward the inner portion.

Since the superconducting magnet comprises the multilayer short-circuit superconductor group of a solenoid type, a racetrack type or a saddle type formed by stacking a plurality of hollow superconducting plates, and is capable of operating in a permanent current mode, even if quenching of some of the superconducting plates occurs, the other normal superconducting plates share the excess current temporarily. Therefore, the entire superconducting magnet is not quenched.

A magnetic field or the uniformity of a magnetic field can be improved by arranging a plurality of multilayer short-circuit superconductor groups.

The superconducting performance can be effectively used by forming the multilayer short-circuit superconducting group so that the sectional area of a portion of the multilayer short-circuit superconductor group in a higher magnetic field region is greater than that of a portion of the same in a lower magnetic field region.

The high-strength support member fitted in or fitted on the multilayer short-circuit superconductor group suppresses the movement of the conductors and prevents quenching.

A rise in temperature of the multilayer short-circuit superconductor group can be suppressed and quenching can be prevented by placing a highly heat-conductive member in or on the multilayer short-circuit superconducting group by forming cooling paths in the multilayer short-circuit superconductor group.

The generated magnetic flux can be effectively used by using a sufficiently long exciting coil, the operation in a permanent current mode can be easily realized by using a high-current exciting method, and the interlinkage magnetic flux can be effectively used by making the multilayer short-circuit superconductor group recover superconducting performance gradually from the outer portion toward the inner portion thereof.

What is claimed is:

1. A method of exciting a laminated superconducting magnet, comprising the steps of:

inducing such a high current that causes a quenching of a multilayer short-circuit superconductor group by increasing the current supplied to an exciting coil to pass a magnetic flux; and trapping a permanent short-circuit current and a permanent magnetic flux in said multilayer short-circuit superconductor group by reducing the current supplied to the exciting coil after said multilayer short-circuit superconductor group has recovered its superconducting performance;

wherein the superconducting performance of the outer portion of said multilayer short-circuit superconductor group is higher than that of the inner portion of the same.

2. A method of exciting a laminated superconducting magnet according to claim 1, wherein said multilayer short-circuit superconductor group is formed of a material that increases the superconducting performance from the outer portion toward the inner portion.

3. A method of exciting a laminated superconducting magnet according 1, wherein the thickness of said multilayer short-circuit superconducting group increases from the outer portion toward the inner portion.

4. A method of exciting a laminated superconducting magnet, comprising the steps of:

inducing such a high current that causes a quenching of a multilayer short-circuit superconductor group by increasing the current supplied to an exciting coil to pass a magnetic flux; and trapping a permanent short-circuit current and a permanent magnetic flux in said multilayer short-circuit superconductor group by reducing the current supplied to the exciting coil after said multilayer short-circuit superconductor group has recovered its superconducting performance;

wherein said multilayer short-circuit superconductor group is provided with a heater, and said multilayer short-circuit superconductor groups is heated so that said multilayer short-circuit superconductor group recovers its superconducting performance gradually from the outer portion toward the inner portion.

5. A method of exciting a laminated superconducting magnet comprising the steps of:

inducing such a high current that causes a quenching of a multilayer short-circuit superconductor group by increasing the current supplied to an exciting coil to pass a magnetic flux; and trapping a permanent short-circuit current and a permanent magnetic flux in said multilayer short-circuit superconductor group by reducing the current supplied to the exciting coil after said multilayer short-circuit superconductor group has recovered its superconducting performance;

wherein the current supplied to the exciting coil is decreased during a process in which said multilayer short-circuit superconductor group recovers its superconducting performance gradually from its outer portion toward its inner portion, and wherein said multilayer short-circuit superconductor group is provided with a heater, and said multilayer short-circuit superconductor groups is heated so that said multilayer short-circuit superconductor group recovers its superconducting performance gradually from the outer portion toward the inner portion.

6. A method of exciting a laminated superconducting magnet, comprising the steps of:

inducing such a high current that causes a quenching of a multilayer short-circuit superconductor group by increasing the current supplied to an exciting coil to pass a magnetic flux; and trapping a permanent short-circuit current and a permanent magnetic flux in said multilayer short-circuit superconductor group by reducing the current supplied to the exciting coil to some extent before said multilayer short-circuit superconductor group recovers its superconducting performance as well as to zero after said multilayer short-circuit superconductor group has recovered its superconducting performance;

wherein the superconducting performance of the outer portion of said multilayer short-circuit superconductor group is higher than that of the inner portion of the same.

7. A method of exciting a laminated superconducting magnet according to claim 6, wherein said multilayer short-circuit superconductor group is formed of a material that increases the superconducting performance from the outer portion toward the inner portion.

8. A method of exciting a laminated superconducting magnet according to claim 6, wherein the thickness of said multilayer short-circuit superconducting group increases from the outer portion toward the inner portion.

9. A method of exciting a laminated superconducting magnet, comprising the steps of:

inducing such a high current that causes a quenching of a multilayer short-circuit superconductor group by increasing the current supplied to an exciting coil to pass a magnetic flux; and trapping a permanent short-circuit current and a permanent magnetic flux in said multilayer short-circuit superconductor group by reducing the current supplied to the exciting coil to some extent before said multilayer short-circuit superconductor group recovers its superconducting performance as well as to zero after said multilayer short-circuit superconductor group has recovered its superconducting performance;

wherein said multilayer short-circuit superconductor group is provided with a heater, and said multilayer short-circuit superconductor group is heated so that said multilayer short-circuit superconductor group recovers its superconducting performance gradually from the outer portion toward the inner portion.

* * * * *